United States Patent [19]

Moosmüller, deceased

[11] Patent Number: 4,733,985

[45] Date of Patent: Mar. 29, 1988

[54] BINDER MECHANISM

[75] Inventor: Helmut Moosmüller, deceased, late of Möncheweiler, Fed. Rep. of Germany, by Marita Moosmüller, legal representative

[73] Assignee: Fa.marmos Büro-und Organsations-mittel, Fed. Rep. of Germany

[21] Appl. No.: 868,942

[22] Filed: May 30, 1986

[30] Foreign Application Priority Data

May 31, 1985 [DE] Fed. Rep. of Germany ....... 3519486

[51] Int. Cl.[4] ........................ B42F 3/04; B42F 13/00; F16B 21/00; F16B 21/09

[52] U.S. Cl. ........................................ 402/27; 402/28; 411/340; 411/347

[58] Field of Search ........................ 402/26, 27, 28, 29, 402/30, 48, 49, 54, 55, 56, 80 R; 411/340, 341, 342, 343, 344, 345, 346; D19/32

[56] References Cited

U.S. PATENT DOCUMENTS 747,416 12/1903 Gottwals .............................. 402/27
1,031,220 7/1912 Williams .............................. 402/27
1,155,382 10/1915 Teamer ................................ 402/28
1,538,605 5/1925 Alden et al. .......................... 402/27
4,172,675 10/1979 Lacourt ................................ 402/27

*Primary Examiner*—E. R. Kazenske
*Assistant Examiner*—Paul M. Heyrana
*Attorney, Agent, or Firm*—McGlew and Tuttle

[57] ABSTRACT

The binder mechanism for loose-leaf binders or file folders comprises a flat, oblong support plate on which are disposed at a standardized mutual distance at least two binder yokes, each consisting of a fixed yoke rod and pivotable yoke part, which is provided with a crank arm. The pivotable yoke parts are operable jointly because they are interconnected by a coupling rod disposed in the support plate. The support plate is made of plastic and has a cavity which is open at its underside and in which the crank arms and the coupling rod are accommodated. The privotable yoke parts are mounted in mounting bushings integrally molded to the likewise plastic crank arms mounted in hollow cylindrical bearing lugs or bearing holes of the support plate. The coupling rod and/or at least one of the crank arms are associated with a releasable detent or locking device which arrests the movable yoke parts jointly in their pivoted position forming the yoke shape. Advantages include: simple and low-cost production, easy handling, great functional reliability.

12 Claims, 13 Drawing Figures

BINDER MECHANISM

FIELD AND BACKGROUND OF THE INVENTION

This invention relates in general to loos-leaf binders and in particular to a new and useful binder having two operationally upright binder yokes which open and close together.

The invention relates particularly to a binder mechanism for loose-leaf binders comrpising an oblong, flat support plate on which are disposed at a standardized distance from each other at least two upright, two-piece binder yokes, each formed of a fixed yoke rod and a yoke part which can be pivoted about an axis vertical in a working position. The pivotable yoke parts have at the support plate level, crank arms which are interconnected by a lengthwise movable connecting link which is disposed in the support plate so that they can be operated jointly.

In one known binder mechanism of this kind (German OS No. 28 10 844) the support plate as well as the three-piece binder yokes comprise metal parts. Each three-piece binder yoke is formed of a cylindrical, hollow rod vertically fastened to the support plate, of a tubular yoke guide also fastened vertically on the support plate and running parallel to the hollow rod, and of a movable yoke which has two parallel legs of different lengths, the shorter of which is free and connected to the longer leg by a yoke. The longer leg is guided in the yoke guide so as to be movable lengthwise and it is rotatable, the free lower end of the shorter leg being engageable with the upper end of the hollow rod. The lower ends of the longer legs of the movable yokes are each provided with a lever arm bent outwardly at right angles, a number of sttionary control slots corresponding to the number of binder yokes being provided for them in the support plate. Each control slot comprises a lower, vertical slot part and an upper horizontal slot part. A sliding rod movable relative to the support plate and having control slots running obliquely relative to the support plate plane and engaged by the lever arms is provided for the movable yokes. While all yokes can be actuated jointly by actuating the sliding rod connecting them in this known binder mechanism, the function principle of the yokes which rpovides for an axial, as well as a pivoting motion when opening and closing, and the structural design tailored to the use of metal parts require relatively many components, the correct assembly of which necessitates much labor and, therefore, high costs. In addition, due to the combined axial and rotary motions generated by slot and link guiding means, great actuating forces are required which in turn cause much wear in connection with the friction occurring thereby. Add to this that the crank arms of the movable yoke parts are kept relatively short for space saving reasons so that the accuracy of motion of these movable yoke parts and, hence, their functional reliability are deficient.

SUMMARY OF THE INVENTION

The invention provides a binder mechanism which can be produced inexpensively, assures easy and always functionally reliable handling, in particular regarding the opening and closing of the binder yokes and is space savingly designed, and can be attached to the back of any binder or file folder in simple manner.

According to the invention, the support plate is advantageously plastic and has, between the upright legs of the binder yokes, a cavity which is open on the underside and extends on both sides beyond the fixed yoke rods in lengthwise directions. The pivotable yoke parts are fastened in mounting bushings integrally molded to plastic crank arms and mounted in hollow cylindrical mounting lugs or mounting holes of the support plate. The crank arms of the movable yoke parts are linked to each other by a coupling rod resembling a flat rod in the manner of an articulated quadrangle and are housed, together with the rod, in the cavity of the support plate. The coupling rod and/or at least one of the crank arms are provided with a releasable detent or locking device which arrests the movable yoke parts jointly in their pivoted position representing the closed yoke form.

The thus characterized binder mechanism comprises a minimum of components which are easy to assemble properly and can be made very inexpensively by injection molding. In addition, the motion transmitting parts are space saving in the support plate cross-section and accommodated so as to be protected against external influences. Since the crank arms do not have to be oriented to the outside and since the cavity may be wide, they may be relatively long so that a precise transmission of motion from one movable yoke part to the other is assured also under the usual manufacturing tolerance conditons. In their closed state, the binder yoke parts are arrested so that an unintentional opening of the yokes does not have to be feared. Another advantage is seen in that no additional actuating member is needed to open and close the binder yokes, that it is rather posssible to efect the opening and closing motion of the movable yoke parts by gripping one yoke part and turning it in the desired direction.

The embodiments of the detent or locking device have the advantage in common of requiring each only one additional function element at the most, namely the roller or locking element and of being easy to assemble as well as simple and easy to handle.

Handling and operating the binder mechanism can be facilitated considerably by providing it with a spring element which effects the opening pivoting motion of the binder yokes upon manually releasing the locking device. One arrangement and embodiment of the spring element achieves the advantage that no extra cost and no additional space requirements are necessary. By designing the binder mechanism so that elastic locking elements support the mounting bushings of the crank arms, the assembly of the movable yoke parts in the base plate becomes very simple in that they only need be pushed from the bottom through or into the mounting holes provided in the support plate in order to be automatically locked in their proper functional end position.

One embodiment makes it possible to achieve a shorter length of the support plate or of the cavity provided therein, in which cavity the crank arms and coupling rod are accommodated. This is of particular importance when the support plate is provided with rivet holes which must be spaced a specified, standardized distance apart so that they can be fastened mechanically to a binder back.

Another advantageous possibility of fastening the binder mechanism to the binder back offers the further advantage of easy and simple exchangeabilty.

Designing the binder mechanism assures an exact connection beween the mutually opposite ends of the fixed yoke rods on the one hand and the movable rod parts on the other so that there appear no disturbing edges at these connecting points when turning sheets over.

Accordingly it is an object of the invention to provide an improved binder mechanism in which there are two operationally upright two piece binder yokes mounted on a support which have connecting rods at their bases in the support which are interconnected by a connecting link so that they operate together.

A further object of the invention is to provide a binder mechanism which is simple in design, rugged in construction and economical to manufacture.

The various features of novelty which characterize the invention are pointed out with particularity in the claims annexed to and forming a part of this disclosure. For a better understanding of the invention, its operating advantages and specific object attained by its uses, reference is made to the accompanying drawings and descriptive matter in which preferred embodiments of the invention are illustrated.

BRIEF DESCRIPTION OF THE PREFERRED EMBODIMENTS

Figure 2:
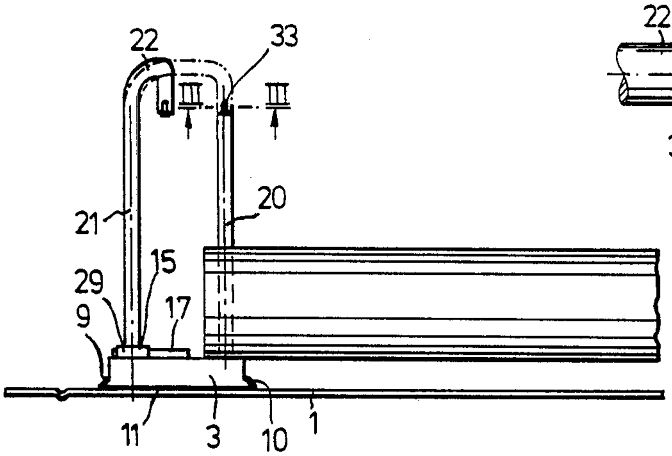
FIG. 2 is a side elevational view of the binder back of FIG. 1.

Referring to the drawings in particular the invention embodied therein comprises binder mechanisms for loose-leaf binders which comprises a support for binder back 1 which includes an oblong support plate 3 on which is mounted at least two operationally upright two-piece binder yokes 18 and 19, each comprising a straight yoke rod portion 20 and a pivotal yoke part 21. In accordance with the invention, each yoke pivotal part is interconnected by a coupling rod or connecting link 35 which has respective ends articulated to crank arms 26 secured to respective movable parts of the yokes.

Shown in the drawings are two different embodiment examples of binder mechanisms: FIGS. 1 through 6 representing the one embodiment and FIGS. 7 through 13 the other.

Figure 4:
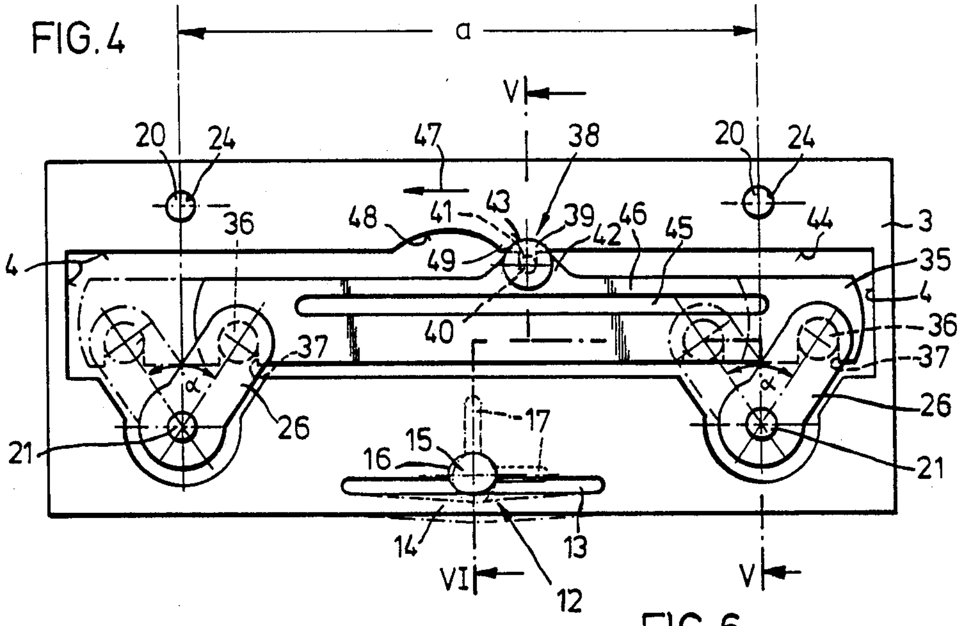
FIG. 4 is a bottom plan view of the binder mechanism of FIG. 1 on a larger scale.

The binder mechanism 2, attached in the usual manner to the inside of a binder back 1 shown only in part, has a flat oblong support plate 3 which is one integral plastic part and is provided with a cavity 4 which is open on its underside and extends nearly over the entire length of the support plate. The cross-section of the support plate is essentially flat rectangular. Along its two long sides 5 and 6 the support plate 3 has marginal ribs 7 and 8 of triangular cross-section each, engaging, in dovetail manner, correspondinlgy shaped marginal strips 9 and 10, respectively of a base plate 11 closing off the cavity 4 towards the bottom in the manner shown in FIGS. 5 and 6 when the binder mechanism is assembled ready for use. The base plate 11 is of the same length as the support plate 3. Otherwise it is designed so that the two marginal ribs 7 and 9 of the support plate 3 can be pushed over the marginal strips 9 and 10 in a lengthwise direction. To fix the support plate 3 on or in the base plate 11 a cocking device 12 is provided. It comprises a marginal web 14 lanced out by making a longitudinal through slot 13 near an edge, and of an oval, i.e. out-of-round cocking pin 15 mounted in a likewise out-of-round hole 16 and turnable by means of a lever arm 17 resting on the top side of the support plate 3. It is schematically indicated in FIG. 4 by dash-dotted lines that by turning the cocking pin 15 in the hole 16, the marginal web 14 can be arched outwardly, thereby bracing the support plate 3 to the base plate 11. In this process, the lever arm 17 is turned out of its angular position parallel to the long side 5 into the position transverse to the longitudinal direction of the support plate 3 as indicated in dash-dotted lines. Instead of the oval cocking pin an eccentric pin could be provided.

The binder mechanism 2 is fastened to the binder back 1 by glueing or riveting the base part 11 directly to the inside of the binder back 1 and subsequently pushing the support plate 3 onto the base plate 11 in the manner described, and cocking it.

Two binder yokes 18 and 19, each consisting of a fixed, straight yoke rod 20 and a pivotale yoke part 21, which also comprises the arch 22 of the yoke, are disposed on the support plate 3 at a standardized spacing of e.g. 80 mm, which is less than the total length of the cavity 4. Each one of the yoke rods 20 and yoke parts 21 consists of round steel. A knurled section 23 at the lower ends of the yoke rods 20 are pressed upright into a matching hole 24 in the support plate 3, thus being rigidly joined to the support plate 3. The movable yoke parts 21 are fastened, secure against rotation, in mounting bushings 25 which comprise a plastic material and to which are integrally molded crank arms 26. The mounting bushings 25 are rotatably mounted in cylindrical bearing holes 27 disposed axis-parallel to the yoke rods 20 or their holes 24 in integrally molded-on mounting lugs 29 projecting from the top side 27 of the support plate 3. The end section of the yoke parts 21 in the mounting bushings 25 are also provided with a knurl 30 each so that they cannot turn in the mounting bushings 25.

Figure 5:
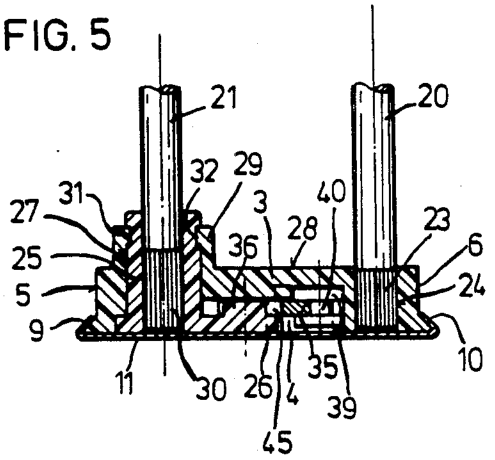
FIG. 5 is a section V—V taken along the line of FIG. 4.
Figure 6:
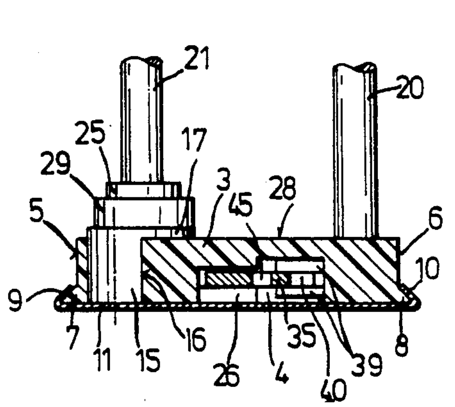
FIG. 6 is a section taken along the line V-VI of FIG. 4.
Figure 12:
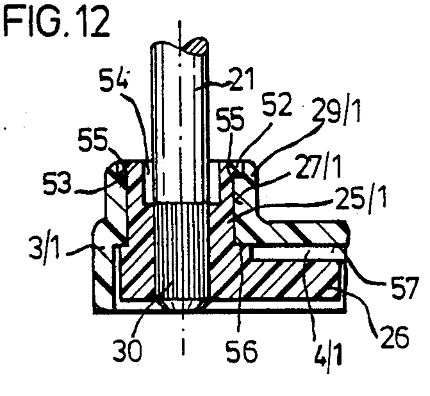
FIG. 12 is a section of the left half of FIG. 11 in larger scale.
Figure 13:
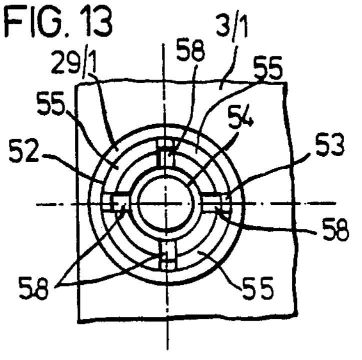
FIG. 13 is a top plan view of the embodiment of FIG. 12.
Figure 9:
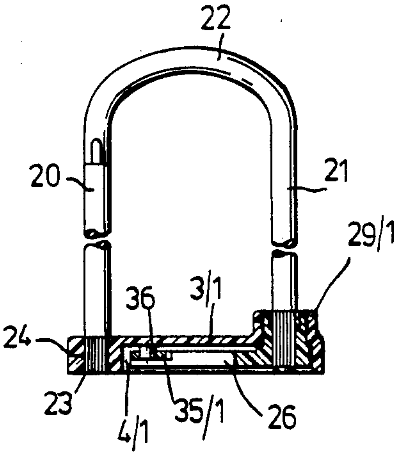
FIG. 9 is a section taken along the line IX—IX of FIG. 7.
Figure 10:
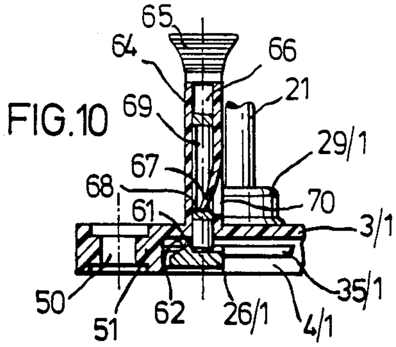
FIG. 10 is a section taken along the line X—X from FIG. 7.
Figure 11:
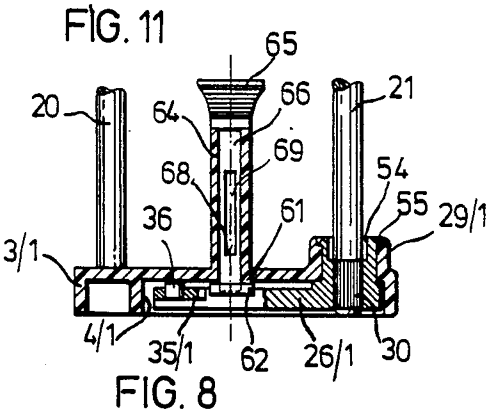
FIG. 11 is a section taken along the line XI—XI of FIG. 8.
Figure 7:
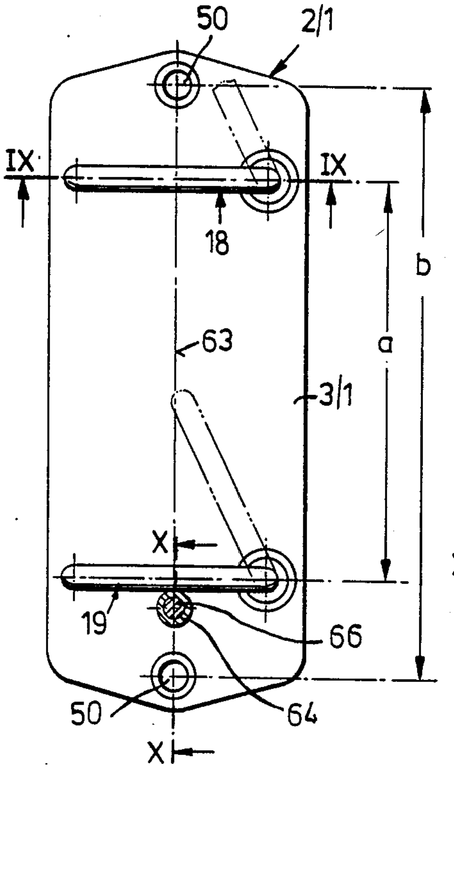
FIG. 7 is a top plan view of another embodiment of binder mechanism.

The mounting bushings 25 are fixed axially in the holes 27 of the mounting lugs 29 in the embodiment shown in FIG. 5 in that an annular rib 31, projecting inwardly and disposed in the upper end zone of the hole 27, enages an annular groove 32 in the mounting bushing 25. The dimensions of the annular rib 31 and the annular groove 32 are such that the mounting bushing 25 can be pushed from the bottom into the hole 27 to bring about the engagement of the annular rib 31 and the annular groove 32 shown in FIG. 5. Since both parts are made of plastic, this kind of axial fixation is realizable without difficulty. Another possibility of such an axial fixation is shown in FIGS. 12 and 13. It is explained below in greater detail together with the embodiment example according to FIGS. 7 through 11.

Figure 3:
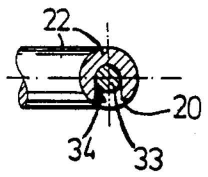
FIG. 3 is a partial section taken along the line III—III of FIG. 2.

As may be seen in FIGS. 2 and 3, the upper end of each yoke rod 20 has a centering pin 33 and the downwardly directed end of the yoke arch 22 is provided with a groove-like recess 34 which accommodates this centering pin 33 in form-closing fashion. The rod 20 is open on the side and its depth is such, as to assure a cross-sectionally flush connection between the two yoke parts in the engaged position shown In FIG. 3.

The two crank arms 26 are interconnected by a flat stock coupling rod 35 in the manner of an articulated quadrangle, as may best be seen in FIG. 4. For this purpose, the crank arms 26 are each provided with a cylindrical hinge pin 36 while the coupling rod 35 has at both its ends U-shaped cutouts 37 each which are engaged in form-closing manner by the hinge pins 36, forming the articulated connection between a crank arm 26 and the coupling rod 35.

Figure 1:
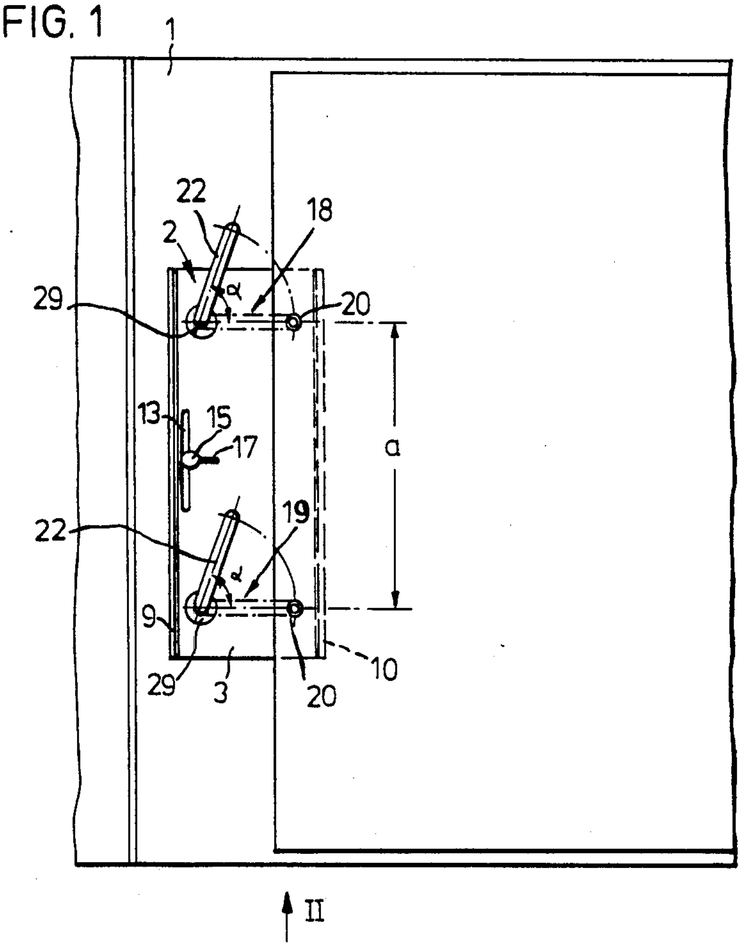
FIG. 1 is a top plan view of a binder mechanism disposed in a binder back and constructed in accordance with the invention.

As is evident from FIG. 4, the contour of the cavity 4 and also its depth are such that the crank arms 26 as well as the coupling rod 35 can be accommodated completely recessed in this cavity 4, with the necessary freedom of motion so that the yoke parts 21 can be turned by an angle alpha of of about 80° to 90° from the closed yoke position indicated in dash-dotted lines in FIG. 1 into their open position shown in solid lines. This turning motion to open and close the binder yokes 18 and 19 can be performed so that one of the two yoke arches 22 is turned manually from the one into the other position, the respecively other yoke part being co-rotated synchronously due to the connection via the coupling rod 35.

In FIG. 4, the solid lines of the crank arms 26 and coupling rod 35 represent the closed position and the dash-dotted lines the open position.

A detent 38 is provided to make certain that the closed binder yokes will not open by themselves. This detent 38 consists of a double roller 39 rotatably mounted on a cylindrical pivot pin 40 in a U-shaped mounting slot 41 of a cam-like projection 42 of the coupling rod 35 and engaging a circular depression 43 in the lengthwise bounding surface 44 of the cavity 4 by snapping in. Due to a slot 45 extending over about three fourths of the coupling rod length, the web-like section 46 of the plastic coupling rod, to which the double roller 39 is mounted, can be deflected spring-elastically in transverse direction, but on the other hand, the double roller 39 is also positively detainable in the depression 43. Because the coupling rod 35 performs no straight, but a circular motion during the pivoting motions of the crank arms 26, there is provided, in opening direction indicated by the arrow 47 (FIG. 4), next to the detent depression 43, in the wall area 44 of the cavity 4, a corresponding depression 48 which adjoins the circular detent depression 43 via a cam-like elevation 49. When opening the binder yokes 18 and 19 and also during the closing motion, this cam-like elevation 49 must be overcome by appropriately deflecting the web-shaped section 46 while simultaneously surmounting the elastic spring-back forces. If, however, the double roller 39 is in the area of the depression 48, it no longer offers resistance to the continued motion of the coupling rod 35. Instead of the double rollr 39, a simple detent cam could be provided as detent element.

In the following description of the embodiment illustrated in FIGS. 7 through 13, all parts also present in the above described embodiment per FIGS. 1 through 6 have the same reference numerals. In this embodiment example of a binder mechanism 2/1 also, the two-piece binder yokes 18 and 19 are disposed in a flat, plastic support plate 3/1, in principle in the same manner as in the above described embodiment example per FIGS. 1 through 6. Instead of the marginal ribs 7 and 8 provided in the support plate 3, the support plate 3/1 has at both its extreme ends a rivet hole 50 for each end, the spacing between them designated b of which is standardized to make the attachment of this support plate 3/1 to the inside of a binder back possible by means of a riveting device usually used for such binder mechanisms.

Because the rivet holes in the base plate 11 of the embodiment example per FIGS. 1 through 6 are not disposed directly in the support plate 3, they have no influence there on the length of the cavity 4 of the support plate 3. In the support plate 3/1, however, rivet eyelets 51 are required at both ends for the accommodation of the rivet holes 50, shortening the length of the cavity 4/1 which is also provided in the support plate 3/1, is open on the underside and yet extends in longitudinal direction beyond yokes 18 and 19, in comparison to the length of the cavity 4. This means that there is less room available for the pivoting motions of the crank arms 26 and 26/1 of the movable yoke parts 21 spaced apart by the distance a in outward direction, i.e. towards the limiting faces of the cavity 4/1. It is for this reason that, to connect the two crank arms 26 and 26/1, a coupling rod 35/1 is provided whose mounting holes 37/1 accommodating the hinge pins 36 are mutually spaced a distance c apart which is shorter than the mutual spacing a of the two binder yokes roughly by the amount correspondign to the length difference between the cavity 4 and the cavity 4/1. This means, however, that the angular accuracy of the motions of the two crank arms 26 is no longer assured. But this is no disadvantage for the handling of the binder mechanism 2/1, it rather accomplishes that the movable yoke parts 21 ae pivotable at least approximately about the same opening or closing angle alpha in this embodiment also.

Apart from the rib-shaped cross-sectional structure of the support plate 3/1, commonly used for injection molding, the cavity 4/1 is designed for the completely recessed accommodation of the crank arms 26 and 26/1 as well as of the coupling rod 35.1 in the same way as in the embodiment example per FIGS. 1 through 6. Due to the fact that the cavity 4/1 is wider than the cavity 4, the crank arms 26 and 26/1 are also longer than those of the embodiment example per FIGS. 1 through 6. The fixed, straight yoke rods 20 are pressed into fitting holes 24 here also while the pivotable yoke parts 21 are fastened in mounting bushings 25/1 of the crank arms 26 or 26/1 which are rotatably mounted in cylindrical holes 27/1 of mounting lugs 29/1. The mounting lugs 29/1 have at their upper face a cylindrical depression 52 forming a radial, annular shoulder 53 (FIG. 12). The mounting bushing 25/1 has at its top a oncentric, cylindrical cutout 54 and its outside has sawtooth-like locking teeth 55 which are in contact with the annular shoulder 53, thereby effecting, in collaboration with an annular collar 56 resting against the roof surface 57 of the cavity 4/1, the axial fixation of the mounting bushings 25/1 and, hence, also of the crank arms 26, 26/1 and of the yoke parts 21. So that the locking teeth 55 can be pushed through the smaller diameter mounting hole 27/1 without difficulty, the part of the mounting bushing 25/1 which has been weakened cross-sectionally by the cutout 54 is split by several radial slots 58 so as to enable the ring section located inbetween to yield elastically inwardly.

When the cutout 54 is subsequently filled out by a ring, this positive connection is made permanent.

Figure 8:
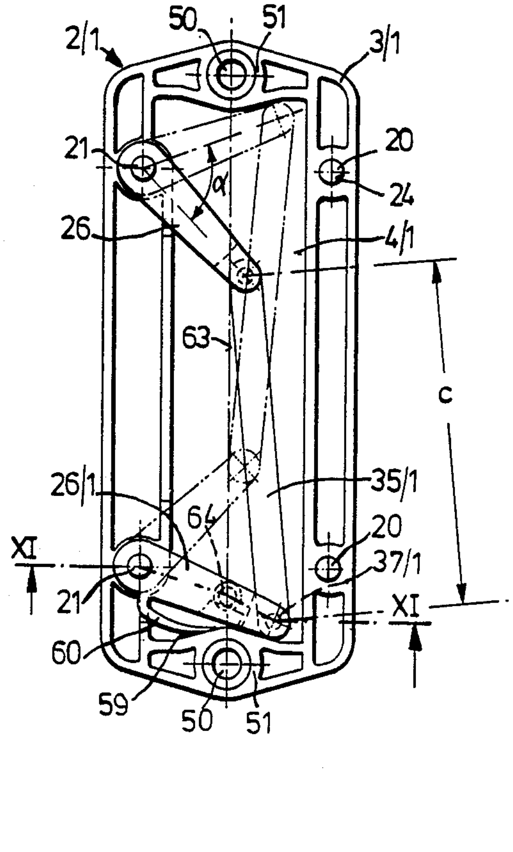
FIG. 8 is a bottom plan view of he binder mechanism of FIG. 7.

As may be seen from FIG. 8, the crank arm 26/1 which, in the closed position of the binder yokes 18, 19, is pivoted close to the inner face 59 of the cavity 4/1, has an integrally molded-on spring tongue 60 which departs from the contour of the mounting bushing 25/1 at least approximately radially and is bent to contact the inner face 59 of the cavity 4/1 and which, in the position of the crank arm 26/1 shown in FIG. 8, exerts a torque in opening direction of the binder yoke upon this crank arm 26/1. But to make this crank arm 26/1 lockable in this closed position, thus keeping both yokes in closed position, this crank arm 26/1 has on its top side a locking tooth 61 (FIG. 10) which is of sawtooth shape and has an oblique lifting surface 62. As locking bar or locking bolt 66 gripping behind this locking tooth and keeping the crank arm 26/1 in its closed position there is molded to the top side of the support plate 3/1 on its longitudinal centerline 63 and, in longitudinal direction. outside of the plane of the binder yoke 19 a sleeve-like guide nipple 64 in which the locking bolt 66 provided with a handle head 65 is mounted so as to be axially movable. The length of the locking bolt 66 is selected so that its lower end section, when the handle head 65 contacts the upper end of the guide nipple 64, projects into the cavity 4/1 and engages behind the locking tooth 61 in the manner shown in FIG. 10. So that the locking bar 66 can be held in this locking position or be brought back into the locking position after having been lifted up either by the oblique lifting surface 62 sliding under it, or manually, the wall of the guide nipple 64 is provided with a spring tongue 67 which arches inwardly and contacts the lower transverse shoulder 68 of an axial slot opening 69 of the locking bolt 66. Since the spring tongue 67 is integrally molded to the guide nipple and, due to the presence of an axial slot 70 in the wall of the guide nipple 64, has the possibility of yielding radially outward when the locking bolt 66 is inserted from above the cylindrical cavity of the guide nipple 64, not only the manufacture of this spring element but also the assembly of the entire locking device becomes very simple and inexpensive. The length of the spring tongue 67 is designed so that it automatically penetrates the slot opening 69 when the locking bolt 66 has reached its lowest position. When raising the locking bolt 66, which can be done either by manually pulling on the handle head 65 or through the lifting surface 62 of the locking tooth 61, the spring tongue 67, whose lower end rests on the transverse shoulder 68, experiences a deflection and, therefore, a tension which causes the locking bolt 66 to reurn into its lowest locking position again as soon as the handle head 65 is released or the lifting surface 62 has been moved through below it.

In this embodiment, the two binder yokes 18, 19 are opened simply by raising the locking bolt 66 by appropriately actuating the handle head 65 for the release of the locking tooth 61 on the crank arm 26/1. The subsequent pivoting motion of the two crank arms 26 and 26/1 which are hinged together by the coupling rod 35/1 is effected by the spring tongue 60. Closing the two binder yokes 18, 19 must then be accomplished by overcoming manually and directly the torque offered by the spring tongue 60 by turning one of the two movable yoke parts 21.

The locking device described could be replaced by one having a molded-on, springy locking pawl in the cavity, for instance which interacts with a locking tooth or locking pin of a crank arm 26, 26/1 or of the coupling rod 35/1 and which can be deflected laterally by means of a pin protruding from the top of the support plate 3/1.

The use of fiberglass reinforced plastic is recommended for the support plates 3 and 3/1, whereas cheaper plastics may be used for the crank arms 26 and 26/1 with the respectively molded-on mounting bushings 25, 25/1 and for the coupling rods 35, 35/1. The yoke parts 20 and 21 are made of round steel in both embodiment examples.

Both embodiment examples make possible a very simple and fully automatic assembly of the binder mechanism, through which an extremely low-cost production is achievable, expecially since only very few components have to be assembled.

While specific embodiments of the invention have been shown and described in detail to illustrate the application of the principles of the invention, it will be understood that the invention may be embodied otherwise without departing from such principles.

What is claimed is:

1. A binder mechanism for loose-leaf binders, comprising a support, at least two operationally upright two-piece binder yokes mounted on said support, each yoke including a fixed yoke rod part and a pivotal yoke part which is rotatable about its axis and a crank arm secured to each pivotal yoke part, a connecting link disposed in said support and pivotably connected at its respective ends to respective crank arms, said support having a cavity open at its underside and extending beyond each binder yoke, said crank arms having mounting bushings into which said pivotal yoke parts are engaged, said support having receiving openings in which said mounting bushings are engaged, said crank arms and said connecting link being disposed in said cavity, and releasable detent means in said support effective to hold said pivotal yoke parts in a closed position, said detent means comprising a roller rotatably mounted on said connecting rod movable therewith, a detent depression disposed in the wall of said support along the cavity, means biasing said roller in a direction toward engagement with the detent depression and being movable into the depression in an operable position of said binder mechanism.

2. A binder mechanism according to claim 1, wherein said connecting link comprises a flat part having an elongated slot behind said detent roller comprising the means mounting said roller so as to be spring elastic when it moves out of the detent depression and moves along the wall bounding the cavity of said connecting link.

3. A binder mechanism according to claim 1, wherein said releasable detent means comprise a locking tooth of saw-shaped configuration molded into at least one of said crank arms and said connecting link forming a slider pawl and hand operated means for deflecting said pawl into and out of engagement with one of said connecting link and said crank arms.

4. A binder mechanism according to claim 3, wherein said slider pawl comprises a locking bolt sleeve-like guide nipple carried on said support overlying the cavity into which said locking bolt is movable, said connecting link having a transverse shoulder which forms a face of an axial groove, and a spring tongue molded to the wall of said guide nipple projecting radially into the axial groove and supported on said locking bolt.

5. A binder mechanism according to claim 1, wherein at least one of said crank arms and said connecting link in provided with a spring element, the spring force of which effects the opening of said binder yokes by turning said pivotal yoke parts.

6. A binder mechanism according to claim 5, wherein said spring element comprises a radial spring tongue molded to at least one of said crank arms and said connecting link and engageable against a wall of the cavity of said support.

7. A binder mechanism according to claim 1, wherein said mounting bushings of said crank arms are anchored self-lockingly into mounting lugs of said support by means of radially elastic detent locking elements.

8. A binder mechanism according to claim 1 wherein the spacing between the joints of the connection of said connecting link to said crank arms is less than that of said binder yokes.

9. A binder mechanism according to claim 1, including a base plate closing the underside of said support, said support comprising a plastic molded member, a support plate closing the underside of said support, said support being rectangular and having a long side with anchoring strips thereon bent in a U-shape and engaged around dove-tail edges of said support.

10. A binder mechanism according to claim 1, wherein the end of said fixed yoke rods and of said pivotabl yoke parts each have within their cross-section depressions and elevations by means of which they can be caused to engage each other in form closing manner.

11. A binder mechanism for loose-leaf binders, comprising a support, at least two operationally upright two-piece binder yokes mounted on said support, each yoke including a fixed yoke rod part and a pivotal yoke part which is rotatable about its axis and a crank arm secured to each pivotal yoke part, a connecting link disposed in said support and pivotably connected at its respective ends to respective crank arms, said support having a cavity open at its underside and extending beyond each binder yoke, said crank arms having mounting bushings into which said pivotal yoke parts are engaged, said support having receiving openings in which said mounting bushings are engaged, said crank arms and said connecting link being disposed in said cavity, and releasable detent means in said support effective to hold said pivotal yoke parts in a closed position, said support comprising a carrier plate, and said carrier plate and said crank arms being of a synthetic material.

12. A binder mechanism for loose-leaf binders, comprising a support, at least two operationally upright two-piece binder yokes mounted on said support, each yoke including a fixed yoke rod part and a pivotal yoke part which is rotatable about its axis and a crank arm secured to each pivotal yoke part, a connecting link disposed in said support and pivotably connected at its respective ends to respective crank arms, said support having a cavity open at its underside and extending beyond each binder yoke, said crank arms having mounting bushings into which said pivotal yoke parts are engaged, said support having receiving openings in which said mounting bushings are engaged, said crank arms and said connecting link being disposed in said cavity, and releasable detent means in said support effective to hold said pivotal yoke parts in a closed position, a base plate closing the underside of said support, said support comprising a plastic molded member, a support plate closing the underside of said support, said support being rectangular and having a long side with anchoring strips thereon bent in a U-shape and engaged around dove-tail edges of said support, said support plate having a marginal strip which has been lanced out of a longitudinal slot near the long edge thereof which can be cocked outwardly by means of an out-of-round eccentric cocking pin rotatable about a vertical axis.

* * * * *